Patented Apr. 17, 1934

1,955,016

UNITED STATES PATENT OFFICE 1,955,016

PROCESS FOR OBTAINING SUBSTANCES IN PURIFIED CONDITION BY A SPECIAL TREATMENT WITH MISCIBLE LIQUIDS OF DIFFERENT SOLVENT POWER AND VOLATILITY

Eugène Charles Prins and Jan Frederik Lemmens, Dordrecht, Netherlands

No Drawing. Application September 22, 1931, Serial No. 564,474. In the Netherlands September 11, 1930

10 Claims. (Cl. 23—84)

Natural products are generally, if not always, accompanied by a greater or smaller number of other substances. In the artificial manufacture of many products, also, generally mixtures are obtained from which the desired substances have to be separated. Generally the substances are extracted from the mixtures. Water is the most obvious solvent, but in many cases this solvent cannot be used, because undesired reactions occur or because besides the desired product many impurities are dissolved so that evaporation yields only a small part of the pure product a substantial portion remaining in the mother-liquor. If the evaporation is carried further the product will be still contaminated by impurities.

Therefore, it has been proposed for special cases to use other solvents, such as alcohols, liquid ammonia or liquid sulphur dioxide whereby the separation sometimes becomes easier and the end product sometimes is obtained in a purer condition. A drawback is that the handling of these volatile solvents presents special difficulties, which must be taken into account, such as working under high pressure. The losses incurred by the use of high pressure generally are not inconsiderable. There is also the drawback that by evaporating the extract individual crystals are not obtained but only impure crystal mixtures.

The invention relates to methods of purification or extraction applicable in many cases, by which in a simple manner by a suitable choice of solvents very pure products in crystallized condition are obtained in a simple operation.

The mixture of the impure substances, such as produced by nature or by an industrial process, if necessary after a pretreatment, such as crushing or comminuting, is treated with a volatile solvent having a good solvent power for the desired substance, such as hydrogen sulfide, carbon-disulfide, sulphur dioxide, ammonia, amines, hydrocyanic acid, carbon dioxide or the like, mixed (either before, during or after the extraction with the volatile solvent) with another suitable liquid having a small solvent power for the desired substance but a sufficient solvent power for the extracted impurities and a higher boiling point or lower vapour pressure than that of the said volatile solvent, after which the more volatile solvent is removed.

The process may be applied to nearly all mixtures of substances whether found in nature or obtained artificially. It is especially suitable for natural minerals containing soluble salts and for impure mixtures of products obtained by a chemical process, such as high temperature processes.

The process may for instance be carried out in such a manner that the mass is extracted by a liquid volatile solvent. The extract is mixed with a suitable organic liquid of higher boiling point and thereafter, if necessary after filtration of the solution, the most volatile solvent is evaporated. By a suitable choice of the quantities and kind of volatile solvents and liquids of higher boiling point the substance obtained will constitute a precipitate in a substantially pure condition, the impurities remaining dissolved in the higher boiling organic liquid. If desired, these may be further worked up after sufficient concentration.

It is not always necessary to mix the most volatile solvent only after the extraction with the organic liquid. One may also, and sometimes advantageously, dissolve the most volatile solvent in the organic solvent and extract with this mixture. This is especially advantageous, if the volatile solvents are gaseous at ordinary temperature such as sulphur dioxide and ammonia. In this case, the pressure in the system may be substantially lower than would be required by the use of a liquefied gas.

It is, of course, possible, if desired to add the less volatile liquid to the volatile solvent during this extraction. It is also obvious that it is not requisite that both components should be simple substances or pure compounds. So, one may use very well mixtures of more volatile solvents and of liquids with a higher boiling point, for instance if this is desirable, in order to increase or decrease the solubility of any given substance.

If the nature of the substances used makes it desirable, the extraction may be carried out under increased pressure.

The product obtained may be dried in known manner, for instance by centrifugal action or in a vacuum, in a drying drum or the like.

As remarked, the process is very simple and is further very economical as losses are small and the substances, used for the extraction, may generally be re-used in the process. For the separation of the most volatile solvent and the poor solvent of higher boiling point, it is often not even necessary to increase the temperature considerably. Sometimes, it is sufficient to release the pressure of the system, for instance when the extraction is carried out under pressure with solvents which are gaseous at normal temperature dissolved in poor solvents of higher boiling point. The desired product obtained has a high degree of purity, so that further purifications are generally superfluous. As remarked, the process according to the invention may be applied to nearly all mixtures of substances, whether naturally present or artificially obtained. For each separate case it is only necessary to find the volatile solvent and poor solvent of higher boiling point most suitable. The following examples illustrate the invention.

*Example 1.—Preparation of nitrate of sodium from caliche*

10 kilos of caliche which contains besides sodium chloride sodium sulfate, salts of magnesium, calcium sulfate, and generally some sodium iodate, about 28% of sodium nitrate and 20% of substances insoluble in water, are treated at 25° C. with a mixture composed of 48% of ammonia and 52% of methyl alcohol at a pressure of 4 atm. By this treatment all the sodium nitrate is dissolved and is separated from the insoluble salts. The solution contains 28% of sodium nitrate, 34% of ammonia and 37% of methyl alcohol, and also the sodium iodate, which may be present in the caliche. By distilling off the ammonia, the sodium nitrate separates in very pure condition whilst the iodate remains dissolved in the alcohol.

*Example 2.—Extraction of alkali cyanides from metal cyanamide-alkali-melt*

The crude product containing alkali cyanides obtained from calcium cyanamide and alkali salts, (for instance by the method of Franck and Caro, German Patent No. 116,087, or by the methods described in German Patents Nos. 480,905 and 482,678), is extracted by about 20° C. without pressure with alcohol containing 10% of ammonia. By this treatment, the alkali cyanide is dissolved and extracted from the insoluble substances, such as soda, carbon, or lime, after filtering the solution and distilling the ammonia the alkali cyanides separate.

In the same manner mixtures of calcium cyanamide and soda, which have been heated to 500-600° C., may be treated to obtain pure sodium cyanate.

Of course, the same process can be carried out under pressure.

*Example 3*

An impure product containing sodium cyanide obtained by heating with nitrogen briquettes containing soda and carbon, with a catalyzer, is treated at a pressure of 2 atm. and a temperature of 20° C. with alcohol, containing 26% of ammonia. Sodium cyanide is extracted together with several impurities. After filtration the extract is distilled to separate the $NH_3$ whereupon pure NaCN separates, whilst the impurities such as alkali sulfocyanates remain dissolved.

In like manner other crude products containing cyanide, such as for instance those obtained according to the British Specification No. 301,565 (describing a process for a manufacture of alkali-cyanides by the action of ammonia and carbon monoxide upon an alkali hydroxide or oxide or salt of an alkali metal at a temperature between 400 and 800° C.), or to German Specification No. 51,562, may be treated with mixtures of ammonia and alcohol and worked up to pure cyanide.

*Example 4*

100 kilos of a spent gas purifier mass containing 40-50 per cent of sulphur, are extracted with 200 kilos of a mixture comprising 60 per cent of ethyl alcohol and 40 per cent of carbon disulphide. From the extract the carbon disulphide is evaporated and the sulphur separates from the remaining solution and is obtained by filtration or decantation.

The same process may be applied with good results to crude Sicilian sulphur containing earth. In both cases it is possible to use hydrogen sulphide instead of carbon disulphide.

It is clear that the volatile good solvents and the less volatile poor solvents specified in each example, are given only as examples, which may be modified in any suitable way. By preliminary experiments one may find, if necessary, the most suitable liquids in each special case and it is obvious that instead of one volatile solvent a mixture of volatile solvents may be used, and also mixtures of less volatile poor solvents may be used. Thus a mixture of methyl and ethyl alcohol in many cases is very suitable. Ammonia may be also substituted by amines. In many cases hydrocyanic acid is an excellent volatile solvent but it has the disadvantage of great toxicity.

Where in this specification removal or distillation of a volatile solvent is mentioned, this removal may be carried out more or less completely; it may be also that a part of the organic liquid may be evaporated, for instance if this is desirable in connection with the relative solubility of the substances which are to be separated.

What we claim is:

1. A process for obtaining a desired substance in purified condition from an impure starting material containing the desired substance by the use of at least two miscible liquids, the one being more volatile and a good solvent for the desired substance, the other being less volatile and a poor solvent for the desired substance but capable of dissolving extracted impurities, said process comprising extracting the starting material with the good solvent, adding the less volatile poor solvent in any stage of the process before distillation, distilling off the volatile good solvent from the resulting extract containing the desired substance, the poor solvent and any impurities, thereby causing the separation of the desired substance in crystallized condition, and separating the crystals from the poor solvent in which latter the impurities remain dissolved.

2. A process for obtaining a substance in purified condition from an impure starting material containing the desired substance, comprising extracting the starting material with a volatile good solvent for the desired substance in admixture with a less volatile poor solvent for the desired substance which is miscible with the good solvent, separating the resulting extract from the undissolved material, distilling off the volatile good solvent, thereby causing the separation of the desired substance in crystallized condition, and separating the crystals from the poor solvent.

3. A process for obtaining a substance in purified condition from an impure starting material containing the desired substance, comprising extracting the stock material with a volatile good solvent for the desired substance, adding to the resulting extract a less volatile poor solvent for the desired substance but miscible with the volatile good solvent and capable of dissolving extracted impurities, distilling off the volatile good solvent, thereby causing the separation of the desired substance in crystallized condition, and separating the crystals from the poor solvent.

4. A process for obtaining a desired substance in purified condition from a natural mineral containing the same, comprising extracting the mineral with a volatile good solvent for the desired substance, adding a less volatile poor solvent which is miscible with the good solvent in any stage of the process before distillation, distilling off the volatile good solvent from the resulting extract containing the desired substance, the poor solvent and impurities, thereby causing the separation of the desired substance in crystallized condition, and separating the crystals from the poor solvent in which the impurities remain dissolved.

5. A process for obtaining alkali cyanide in purified condition from an impure starting material containing alkali cyanide comprising extracting the mixture with a volatile good solvent for the alkali cyanide, adding a less volatile poor solvent for the alkali cyanide but capable of dissolving extracted impurities, in any stage of the process before distillation, distilling off the volatile good solvent from the resulting extract containing the alkali cyanide, the poor solvent and impurities, thereby causing the separation of the alkali cyanide in crytallized condition, and separating the crystals from the poor solvent in which the impurities remain dissolved.

6. A process for obtaining purified alkali cyanide from an impure starting material containing alkali cyanide, comprising extracting the starting material with the volatile solvent of the ammonia type, adding an alcoholic liquid with a poor solvent power for alkali cyanide but capable of dissolving extracted impurities, in any stage of the process before distillation, distilling the volatile solvent of the ammonia type from the resulting extract containing the alkali cyanide and the alcoholic liquid, thereby causing the separation of crystallized alkali cyanide in purified condition, and separating the crystals from the alcoholic liquid.

7. Process for obtaining purified sodium cyanide from the solid product obtained by treating briquettes containing carbon, soda and a catalyst with nitrogen at high temperature, which process comprises extracting the solid product with ammonia, filtering the resulting extract, adding to the filtered extract commercial alcohol, distilling off the ammonia, thereby causing the precipitation of sodium cyanide in crystallized condition, and separating the crystals from the mother liquor.

8. A process for obtaining purified alkali cyanate from the reaction product obtained by heating a mixture of calcium cyanamide and alkali carbonate to a temperature of 500–600° C., which comprises extracting the reaction product with a volatile good solvent for alkali cyanate adding a less volatile poor solvent for alkali cyanate but capable of dissolving extracted impurities, in any stage of the process before distillation, distilling off the volatile good solvent from the resulting extract containing the alkali cyanate, the poor solvent and impurities, thereby causing the separation of the alkali cyanate in crystallized condition, and separating the crystals from the poor solvent in which the impurities remain dissolved.

9. A process for obtaining pure sulphur from an impure starting material containing elemental sulphur, comprising extracting the starting material with a mixture of alcohol and carbon disulphide, separating the resulting extract from the starting material residue, evaporating the carbon disulphide, thereby causing sulphur to separate in crystallized condition, and separating the crystallized sulphur from the alcohol.

10. A process for obtaining pure sulphur from spent gas-purifying mass which comprises extracting the mass with a mixture of alcohol and carbon disulphide, separating the resulting extract from the mass residue, evaporating the carbon disulphide, thereby causing sulphur to separate in crystallized condition, and separating the crystallized sulphur from the alcohol.

EUGÈNE CHARLES PRINS.
JAN FREDERIK LEMMENS.